United States Patent
O'Connor et al.

(10) Patent No.: US 6,693,271 B2
(45) Date of Patent: Feb. 17, 2004

(54) OBSTACLE DETECTION SENSOR USING SYNCHRONOUS DETECTION

(75) Inventors: Christopher J. O'Connor, Northville, MI (US); Stephen A. Hawley, Bedford, MA (US)

(73) Assignee: Prospects, Corp., Novi, MI (US)

( * ) Notice: Subject to any disclaimer, the term of this patent is extended or adjusted under 35 U.S.C. 154(b) by 0 days.

(21) Appl. No.: 10/212,602

(22) Filed: Aug. 5, 2002

(65) Prior Publication Data

US 2002/0190195 A1 Dec. 19, 2002

Related U.S. Application Data

(62) Division of application No. 09/737,538, filed on Dec. 15, 2000, now Pat. No. 6,455,839.

(51) Int. Cl.[7] .............................................. H01J 40/14
(52) U.S. Cl. .................................. 250/214 AL; 250/221
(58) Field of Search ............................ 250/221, 222.1, 250/559.4, 214 LA, 214 A, 214 LS, 214 B, 214 AL

(56) References Cited

U.S. PATENT DOCUMENTS

| | | | | |
|---|---|---|---|---|
| 4,207,466 A | * | 6/1980 | Drage et al. ............. | 250/338.1 |
| 4,713,534 A | * | 12/1987 | Masters et al. ......... | 250/214 B |
| 4,733,081 A | * | 3/1988 | Mizukami ................ | 250/341.8 |
| 4,988,983 A | * | 1/1991 | Wehrer ..................... | 345/175 |
| 5,138,149 A | * | 8/1992 | Cadet et al. .......... | 250/214 AG |
| 5,326,967 A | | 7/1994 | Herrmann et al. .......... | 250/221 |
| 5,684,294 A | | 11/1997 | Kouhi .................. | 250/214 AL |
| 6,157,024 A | | 12/2000 | Chapdelaine et al. | |
| 6,417,503 B1 | * | 7/2002 | Tsuruta .................. | 250/214 A |
| 6,486,464 B1 | * | 11/2002 | Ma et al. ................ | 250/223 R |

FOREIGN PATENT DOCUMENTS

WO    WO 01/56142 A1    8/2001

* cited by examiner

*Primary Examiner*—Edward J. Glick
*Assistant Examiner*—G. Kao
(74) *Attorney, Agent, or Firm*—Weingarten, Schurgin, Gagnebin & Lebovici LLP

(57) ABSTRACT

An object detection system employs a photo-emitter and photo-detector for synchronously detecting and processing an optical signal reflected from an object in a pinch zone of a window or door opening. A photo-emitter light signal is modulated by a modulation signal having an active phase and an inactive phase. The optical detector provides an optical detector signal that is a function of the intensity of the received light. The detected light signal is synchronously detected using a switching amplifier that multiplies the reflected modulated light signal by a first gain during the active phase and by a second gain during the inactive phase. The duration of the active and inactive phases and the first and second gains are selected such that the system gain will average to zero for ambient light when integrated over a predetermined measurement period. The synchronously detected signal is subtracted from a predetermined offset voltage, and this difference is then integrated over the measurement period. The output of the integrator is then compared to a predetermined threshold value.

5 Claims, 6 Drawing Sheets

OBSTACLE DETECTION SENSOR USING SYNCHRONOUS DETECTION

CROSS REFERENCE TO RELATED APPLICATIONS

This application is a divisional of U.S. patent application Ser. No. 09/737,538, filed Dec. 15, 2000 U.S. Pat. No. 6,455,839.

STATEMENT REGARDING FEDERALLY SPONSORED RESEARCH OR DEVELOPMENT

N/A

BACKGROUND OF THE INVENTION

The present invention relates to a method and apparatus for providing an indication of the presence of an object within a pinch zone located in the path of an automated closure device such as a powered window, powered sunroof, powered door or hatch using an optical sensor, and more particularly to the use of an optical sensor that incorporates a synchronous detection amplifier to selectively amplify the desired light signal in the presence of ambient light and electronic noise.

Closures for apertures such as vehicle windows, sunroofs and sliding doors are now commonly motor driven. As a convenience to an operator or passenger of a vehicle, power windows are frequently provided with control features for the automatic closing and opening of an aperture following a simple, short command from the operator or passenger. Alternatively, automatic closing and opening of an aperture may be in response to an input from a separate device, such as a rain or temperature sensor. For instance, a driver's side window may be commanded to rise from any lowered position to a completely closed position simply by momentarily elevating a portion of a window control switch, then releasing the switch. This is sometimes referred to as an "express close" feature. This feature is also commonly provided in conjunction with vehicle sunroofs. Auto manufacturers may also provide these features in conjunction with power doors, hatches or the like. Such automated aperture closing features may also be utilized in various other home or industrial settings.

In addition to providing added convenience, however, such features introduce a previously un-encountered safety hazard. Body parts or inanimate objects may be present within an opening when a command is given to automatically close the window or door. For example, an automatic window closing feature may be activated due to rain impinging on an interconnected rain sensor while a pet in the vehicle has its head outside the window. A further example includes a child who has placed its head through a window or sunroof that is activated to close by the driver, another passenger or accidentally by the child.

In order to avoid potentially tragic accidents or property damage involving intervening objects entrapped by power windows or sunroofs, systems have been developed which detect the circumstance in which a window has been commanded to express close but closure has not occurred within a given period of time. As an example, a system may monitor the time it takes for a window to reach a closed state. If a temporal threshold is exceeded, the window is automatically lowered. Another system monitors the electrical current drain attributed to the motor driving the window. If it exceeds a predetermined threshold at an inappropriate time during the closing operation, the window is again lowered.

The problem with such safety systems is that an intervening object must first be entrapped and subject to the closing force of the window or other closure device for a discrete period of time before the safety mechanism lowers the window or reverses the sunroof or other closure device. Personal injury or damage to property may still occur in such systems. In addition, if a mechanical failure in the window driving system occurs or if a fuse is blown, the person or object may remain entrapped.

Non-contacting object detection systems are known which detect the presence of an intervening object within an open area. Such systems include, for example, security systems and garage door safety interlocks, to detect interruption of a light beam across an opening. Other systems are used with automotive apertures having motorized closure members such as windows, sunroofs, and sliding doors, to detect an intervening object proximate or extending through the respective aperture. Undesired operation of an aperture closure member is therefore prevented when an intervening object such as a finger or arm is extended through the opening during closure; the closure member is not required to come into contact with the intervening object for the object to be detected.

Such object detection systems typically measure the magnitude of a reflected signal to determine the presence or non-presence of an intervening object. A photo-emitter emits a light beam which an optical system directs across the opening that is being monitored. An uninterrupted opening may result in the reflection of at least a some portion of the emitted beam from the opposing side of the aperture. A photo-receiver disposed in an appropriate location receives the reflected light beam and generates an output signal indicative of the intensity of the reflected beam. Reflection from the opposing side ordinarily results in a reflected signal of a well-defined intensity being returned to the receiver. Alternatively the emitted beam may be directed so that it may graze or not strike an opposing member in which case little or no light energy may be returned in the absence of an object in the opening. An intervening object located in the path of the light beam changes the intensity of the reflected light beam, a condition reflected in the detector output signal. The detector output signal with an object in the opening being monitored will thus differ from the detector output signal in the absence of an object. Depending upon the reflectivity of the intervening object and the reflectance characteristics of the aperture environment, the detector output signal will be greater or less than the nominal output signal from the detector.

These optical systems, however, are vulnerable to interference by ambient light such as sunlight as well as fluorescent and incandescent overhead illumination. Prior art solutions have included the use of synchronous detectors and "judgment circuits" consisting of a number of logic circuits coupled together. These judgment circuits however, are still susceptible to interfering sunlight. In addition, these judgment circuits typically include several steps each of which contains several digital logic circuits. The large number of parts associated with the judgment circuits can increase both the power that is consumed and dissipated as heat, and also can increase the cost associated with the object detection circuitry.

It would therefore be desirable to provide an apparatus and method for detecting the presence of an object by measuring a change in a light signal that is received in the presence of ambient light, and which can be calibrated or initialized in such a way so as to cancel the portion of the signal that is not associated with an obstacle. Preferably, such an apparatus provides enhanced accuracy by reducing the effect of the interfering ambient light while using fewer parts and consuming less power than then prior art.

BRIEF SUMMARY OF THE INVENTION

A method and apparatus are disclosed for sensing an object by an optical sensor that utilizes synchronous detection and an integrator for separating a desired optical signal from ambient light and electronic noise as well as a means for canceling modulated energy from features of the environment not associated with an object in the opening.

In one embodiment, the system includes a modulator driving a photo-emitter and a switched amplifier with first and second modulation signals respectively. A photodetector receives a portion of light reflected from the pinch zone and/or an object therein and provides an optical detector signal to the switched amplifier.

The switched amplifier has a first input coupled to the optical detector signal and a second input connected to a reference voltage. This amplifier alternately switches between two phases thus providing a first gain corresponding to the active state of the photo-emitter and a second gain of opposite polarity corresponding to the inactive state of the photo-emitter. The switched amplifier provides an output signal that includes a first voltage that results from the difference between the amplified optical detector signal at the first input and the reference signal at the second input multiplied by the first gain during the active phase followed by second voltage that results from the difference between detector output signal and the reference signal multiplied by said second gain during the inactive phase. The first and second gains and the duration of the active and inactive phases of the measurement period are selected in such a way that the gain of said switched amplifier has an average value of zero when no optical signal is present when averaged over a predetermined measurement period which will include at least one pair of active and inactive phases and may include many such pairs.

The obstacle detection system further includes a means to electronically integrate the difference between output of the switched amplifier and an adjustable reference voltage for a predetermined measurement time. The integrator is configured and arranged to integrate the output signal of the switched amplifier over at least one active phase and inactive phase, and to provide an integrator output signal. A detector receives the integrator output signal and is configured and arranged to provide indicia of the presence or absence of an object within said pinch zone. In a preferred embodiment the reference voltage input to the integrator is selected so that the output voltage changes significantly only when an object is present in the monitored opening. A detector element monitors the integrator output signal and is configured and arranged to provide indicia of the presence or absence of an object within said pinch zone.

BRIEF DESCRIPTION OF THE SEVERAL VIEWS OF THE DRAWING

The invention will be more fully understood with reference to the following detailed description in conjunction with the drawings of which.

DETAILED DESCRIPTION OF THE INVENTION

Figure 1:
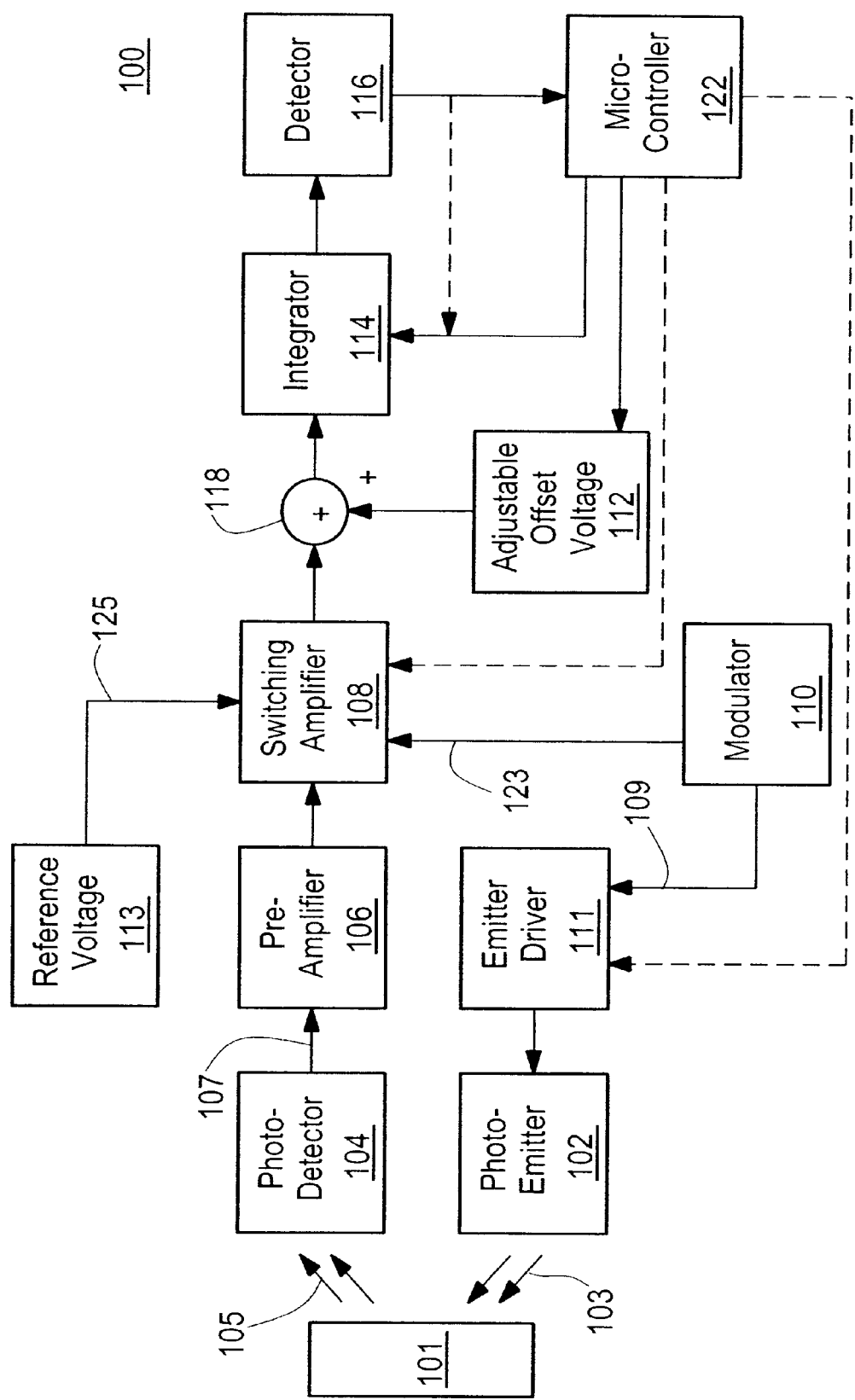
FIG. 1 is a block diagram of the optical sensing system as employed in the presently disclosed invention.

A method and apparatus for detecting the presence of an object within a pinch zone of an automated closure device such as a power sunroof, power window, or a powered door or hatch is disclosed. The definition of the pinch zone varies depending upon the nature of the automated closure device. For example, if the automated closure device comprises a power-assisted, sliding closure member such as a power sunroof, a power window, or a power door, the pinch zone is defined by a leading edge of a closure member and a portion of the aperture defining a terminal portion of the aperture opening with the closure member leading edge. If the closure device comprises a powered, hinged door or hatch or a powered revolving door, the pinch zone is generally a plane defined by an edge of the aperture approached by the leading edge of the door or hatch and a line adjacent the aperture edge in the path of travel of the leading edge of the door or hatch.

In each of the embodiments described herein, a measurement period is a predetermined period of time containing at least one active phase and at least one inactive phase. As used herein, an active phase is a period of time in which a photo-emitter provides illumination. Similarly, as used herein, an inactive phase is a period of time in which a photo-emitter does not provide illumination.

The obstacle detection system includes an optical sensor that receives a modulated light signal provided by a photo-emitter temporally controlled by modulation signal. The photo-emitter provides illumination of the window or other opening during the two or more active and inactive phases of a measurement period. An intervening object within the pinch zone reflects a portion of the illumination provided by the photo-emitter and provides a reflected light signal. In addition, depending on the direction and the shape of the emitted light beam, the opposing side of the opening may, or may not, also reflect light back to the photo detector. One or more photo-detectors receive the reflected light signal and provide a detector output signal indicative of one or more characteristics of the received reflected light signal. The detector output signal may be an analog signal such as a voltage or an electrical current, or a digital output signal. The obstacle detection system processes the detector output signal to provide an indication of the presence or absence of an intervening object within the pinch zone.

The detector output signal is first pre-amplified then synchronously detected by a switching amplifier. The resulting signal is averaged by integrating over a predetermined measurement period prior to comparison to a predetermined threshold value. The predetermined threshold value is determined to represent the effect of an object in the opening. As used herein, synchronous detection utilizes a switching amplifier having first and second inputs. Each input is switched between first and second gains in a manner that is synchronous to the active phase(s) and inactive phase(s) of a measurement period. The switching amplifier switches the detector output signal from the first gain to the second gain synchronously with the illumination provided by the modulated light source.

The first and second gains, the duration of the active and inactive phases, and the number of active and inactive phases within a measurement period are selected to reduce the level of background interference from ambient light sources. The above values are selected such that, in the absence of a modulated light signal, the average or integrated value of the switching amplifier output will not change from its initial value over a measurement period. Thus, any signals that are not synchronous with the modulated light signal, i.e., signals that are present during both the active and inactive phases of a measurement period, will be averaged or integrated to zero over the measurement period. Averaging or integrating the switched amplifier output will remove the non-synchronous background signals from further processing so that they will not interfere with the detection of obstacles within the pinch zone. The output from the switching amplifier is integrated over a measurement period that may include one or more active and inactive phases. By allowing the measurement period to include multiple phases, spurious signals that are coincidentally correlated with the modulated light signal over only one or two activation periods can be removed and the number of false alarms reduced. The averaged or integrated value is compared to a predetermined threshold value to determine the presence or absence of an obstacle within the pinch zone, and an appropriate indication can be generated.

Referring to FIG. 1, a modulator 110, or alternatively a micro-controller 122 which may have an internal timing system, provides a modulation signal 109 to the photo-emitter driver 111. The photo-emitter driver 111 provides the power to the photo-emitter 102 that provides the modulated light signal 103. The photo-emitter 102 may be configured and arranged with an optical system to provide various patterns of illumination. For example, the various patterns of illumination may be in the form of a plane of light, a multifaceted fan of light having a plurality of fingers, or a narrow beam of light. An object 101 reflects at least a portion of the incident light 103 and some portion of the reflected light signal 105 impinges upon a photo-detector 104. The photo-detector 104 generates a detector output signal 107 that is indicative of at least one characteristic of the reflected light signal 105. The photo-detector 104 provides the detector output signal 107 to the input of preamplifier 106. The preamplifier 106 amplifies the detector output signal 107 and provides the amplified detector output signal to the switched amplifier 108.

The switched amplifier 108 is coupled to a modulation signal 123. The modulation signal 123 controls the switched amplifier 108 such that the switched amplifier 108 switches the preamplified detector output signal and a reference voltage signal 125 between first and second gains. The switched amplifier 108 provides an output that is the difference between the two inputs multiplied by the corresponding gain. As will be explained below, in some embodiments the duration of the inactive phase of modulation signal 123 is slightly longer in duration than the corresponding active phase of the modulation signal 109 provided to the photo-emitter driver 111. This longer duration prevents small phase shifts that might occur in the photo-signal in the preamplifier 106 from shifting in time into the inactive phase of the amplifier and causing self-interference. A non-zero reference voltage signal may be used to establish a "no-signal" voltage level when a single rail voltage supply is used in the illustrated embodiment. As will be explained below, the preamplified detector output signal is multiplied by the first gain during the active phase of the measurement period, and by the second gain during the inactive phase of the measurement period. The switching amplifier 108 driven by the modulation signal 123 performs synchronous detection of the preamplified detector output signal.

An adjustable predetermined offset voltage 112 can be arithmetically combined with the synchronously detected signal to reduce the difference between the output of the switched amplifier and the reference voltage 113 to provide a substantially zero average value when no obstacle is within the pinch zone. Therefore, even though some reflected light may be returned from the opposing members of the monitored opening, little or no signal will be present. As will be explained below, the adjustable offset voltage 112 may be determined during a calibration or initialization process prior to use or it may be determined on a periodic or as-needed basis.

An integrator 114 receives the difference between the synchronously detected signal and the adjustable offset voltage 112. The integrator 114 integrates this difference signal over a measurement period and provides an integrated signal to the detector 116. A measurement period is initiated by resetting the integrator to a known value.

The output of the integrator is monitored by detector 116 that compares the integrated signal during a measurement period to a predetermined threshold and generates indicia of the absence or presence of an object within the pinch zone. In another embodiment, an object is detected if the detector measures the time required for the output of the integrator stage to change by a predetermined amount and the measured time is less than a predetermined value. In another embodiment a microcontroller 122 may monitor either the voltage or the time as discussed above. In yet another embodiment the detector 116 may be configured to generate the reset pulse independent of microcontroller intervention. In this embodiment, the frequency at which reset pulses are generated can be used as indicia of an obstacle in the opening.

Figure 5:
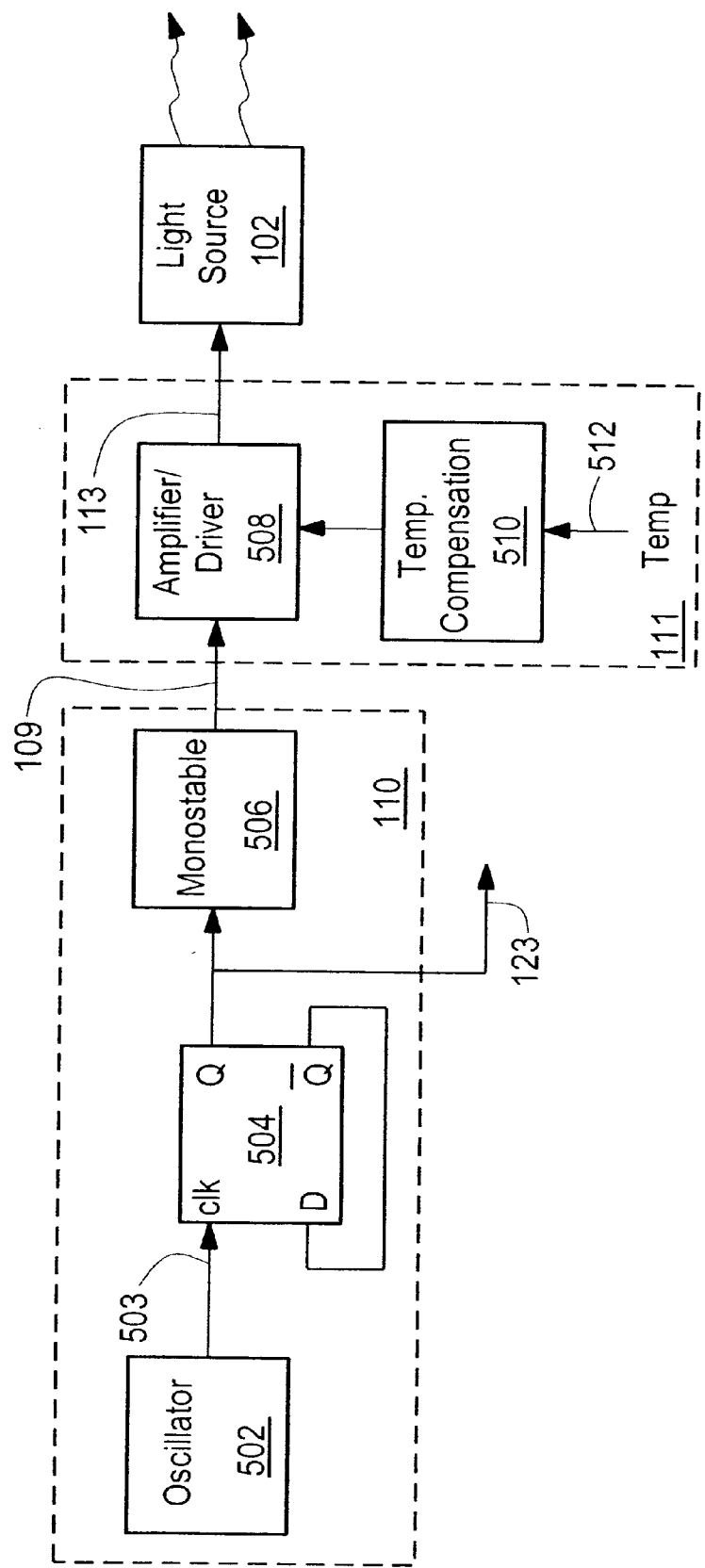
FIG. 5 is block diagram of the modulator and photo-emitter driver/amplifier of FIG. 1.

FIG. 5 illustrates one embodiment of a modulator 110 and a photo-emitter driver 111 that are suitable for use with the obstacle detection system 100. Modulator 110 includes an oscillator 502 that is operative to provide a train of suitable pulses at a predetermined frequency and a predetermined duty cycle to a frequency divider 504. In the illustrated embodiment, the frequency divider 504 is a D flip-flop configured as a frequency divider. The D flip-flop provides an output of square wave pulses at a frequency that is one-half the predetermined frequency of the oscillator and sets the duty cycle at substantially 50%. This signal is used to modulate the switching amplifier. By making the duty cycle substantially 50%, the active phases and the inactive phases of the switching amplifier will have the same duration. Consequently, the condition of zero average gain of the switching amplifier will be achieved when the amplifier gain during the active phase is equal in magnitude but opposite in sign to the amplifier gain during the inactive phases of the modulation. If some errors associated with signal phase shifts can be tolerated, the signal 123 can also be used to modulate the light source directly. Otherwise, as illustrated, the 50% duty cycle square wave modulation can be used to trigger a pulse of shorter duration than the active phase of the signal used to modulate the switching amplifier. As mentioned above the use of this secondary pulse generator permits the active phase of the light output to be constrained entirely to the active phase of the switching amplifier in the presence of amplifier induced phase shifts and prevents self-interference.

Figure 7:
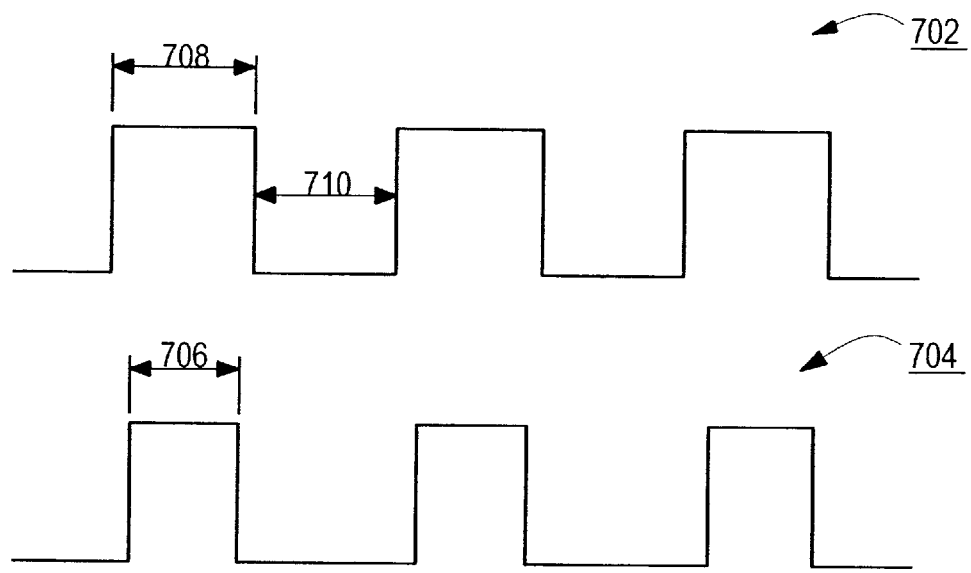
FIG. 7 is a timing diagram of a modulation signal provided to the switched amplifier and photo-emitter of FIG. 1.
Figure 8:
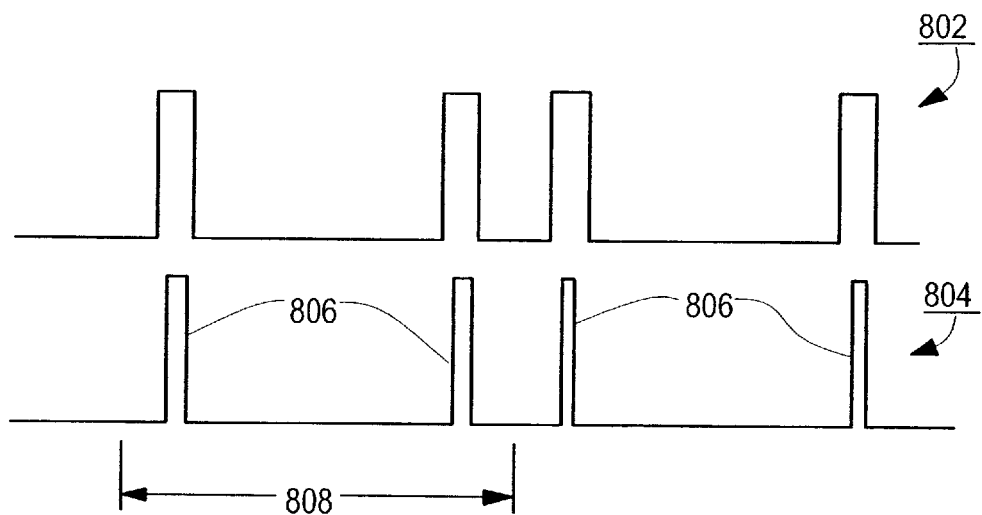
FIG. 8 is a timing diagram of a modulation signal provided to the switched amplifier and photo-emitter of FIG. 1.

In other embodiments the amplifier can be periodic but have a duty cycle other than 50% as shown in FIG. 7. The requirement for zero average gain over one pair of cycles in this case is satisfied when the product of the amplifier gain during active phase times the duration 708 of the active phase is equal in magnitude but opposite in sign to the product of the gain of the inactive phase times its duration 710. As is the case for a 50% duty cycle modulation, the duration 706 of the active phase of the photo-emitter can be set to be shorter than the corresponding phase 708 of the switching amplifier to avoid errors due to phase shifts. The switching amplifier 108 receives this output 123 of square waves 702 from the frequency divider 504. The switching amplifier 108 uses this square wave pulse train 702 for switching the switched amplifier inputs between the first and second gains. In addition, a monostable multivibrator 506 receives the square wave pulse train 702. In the illustrated embodiment, the monostable 506 triggers on a positive going transition of each pulse. The monostable 506 produces a pulse having a width that is slightly less in duration than the positive pulses 708 provided by the frequency divider 504 to the switched amplifier 108. FIG. 7 illustrates this where the pulse train 702 is provided to the switched amplifier 108 and the monostable 506. It can be seen that the output 109 of the monostable 506, the pulse train 704, has a shorter duration 706 when compared to the duration 708 of the pulse train 702. This difference in the duration of the activation phases ensures that the illumination time of the photo-emitter 102 is smaller than the active phase of the switched amplifier. This prevents any "spill over" into the inactive phase of the measurement period by the active phase. In a preferred embodiment, the oscillator 502 can be a 555 timer configured for astable operation. The monostable can be a 555 timer configured for monostable operation, and in one embodiment a 556 dual timer can be used for both the astable portion and the monostable portion of the circuit.

In some cases, more complex modulation waveforms may be useful. For example, in applications where security is required it will be useful that the modulation scheme cannot be defeated by a simple external device. In this case, a microcontroller 122 may be used to generate more complex modulation waveforms having different characteristics in terms of the duty cycle and the periodicity and symmetry of the waveforms. For example, the microcontroller 122 may be programmed to provide an aperiodic or pseudo random pulse train in which the duty cycle is much less or much more than 50%. In these cases, there may be more than one pair of active and inactive phases in each measurement period. As long as the condition for zero average switching amplifier gain over the measurement period is achieved, the detection scheme will provide the desired selectivity.

In this embodiment, a microcontroller may be employed to select the phase duration(s) from a predetermined table of pseudorandom values that have been calculated so that the total duration of the inactive and active phases is the same when summed over the measurement period. Alternatively, RDAC's could be used as R312 and R 308 and programmed by the microcontroller to balance the signal on a phase by phase basis.

In some applications it may be desirable to employ a light emitter such as a flash lamp and certain types of LED's and laser devices for which the active phase is characterized as events of very short duration. In these instances the duty cycle associated with the active phase may approach 0%. When this condition applies, a very simple implementation of the switched amplifier becomes possible. Instead of switching between positive and non-positive gains during the respective phases, the amplifier need only switch between zero gain during the inactive phase and a non-zero gain when the light sources is active. In other words the switching amplifier is simply an amplifier that is turned on when the light is on and off when the light is off. The average gain will now be approximately zero over the measurement period. Waveforms 802 and 804 show modulation signal 123 and 109 respectively, wherein waveform 804 includes the shorter duration activation phase pulses 806. As illustrated this waveform has a duty cycle that is much less than 50% and in which there may be more than one active phase and inactive phase per measurement period 808.

The monostable 506 provides the shorter duration activation phase pulses to the photo-emitter amplifier/driver 508, which in turn drives the photo-emitter 102 into illumination. The photo-emitter 102 may be one, two, or more photo-emitters and the configuration of the photo-emitters is such that the pinch zone is fully illuminated. In a preferred embodiment, the photo-emitters are light emitting diodes (LED's) that operate in the infrared region of the optical spectrum.

In the illustrated embodiment, the amplifier driver includes an optional temperature compensation module 510. As is known, a change in the ambient temperature changes the intensity of the illumination of an LED. To avoid a false alarm or a missed intervening object due to fluctuations in the intensity of the illumination caused by temperature, a stable constant level of illumination is desirable. If there is a significant amount of background energy the temperature induced change in the illumination signal can be confused with that arising from an obstacle. In one embodiment, a temperature compensation module 510 can maintain a constant drive level to the LED's in response to signals 512 from a temperature sensor (not shown).

Figure 6:
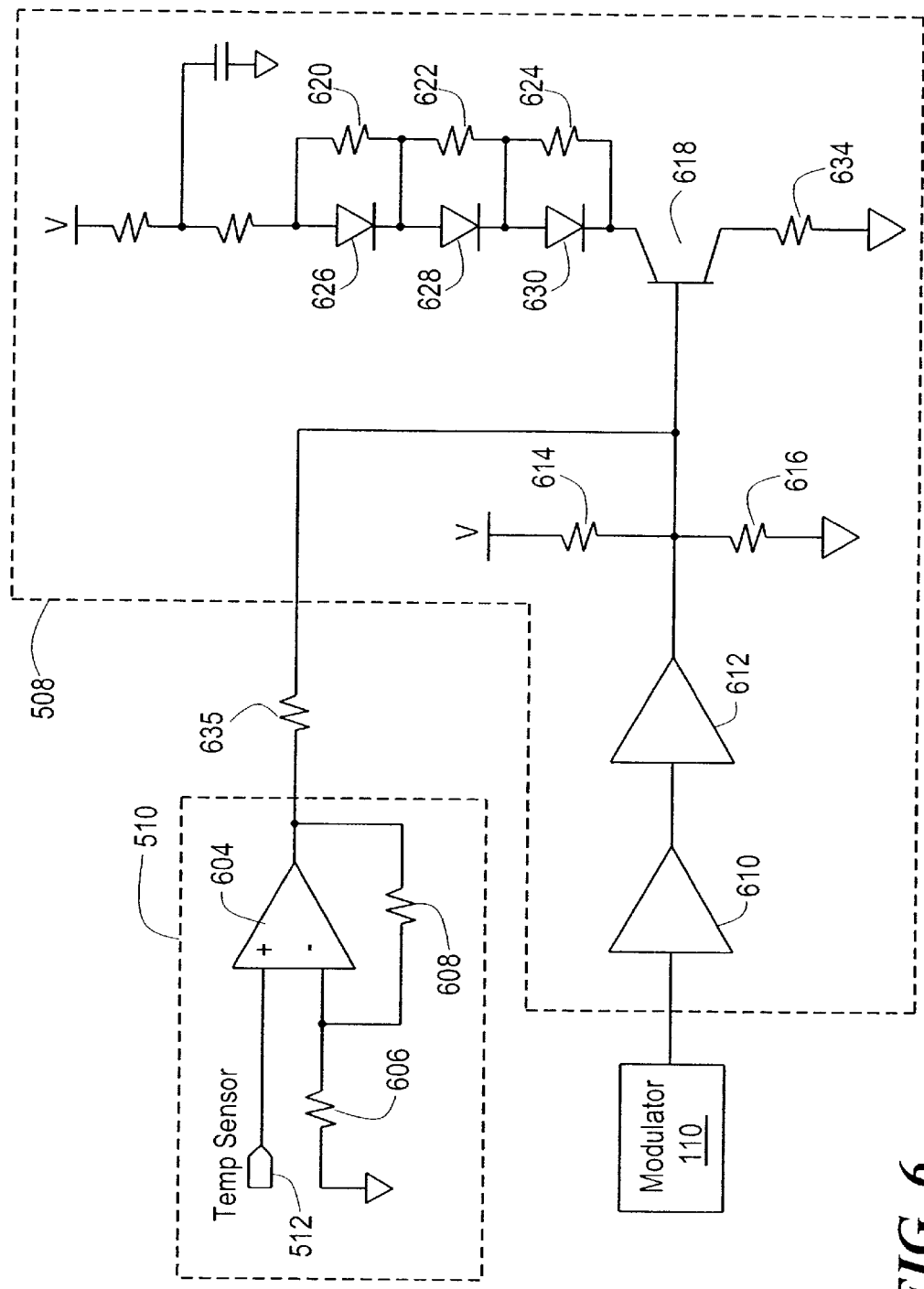
FIG. 6 is a schematic diagram of the driver/amplifier circuit 508 of FIG. 5 along with a typical temperature compensation circuit 510.

FIG. 6 illustrates one embodiment of a temperature compensating circuit 510 and LED driving/amplifying circuit 508 suitable for use with the obstacle detection system 100. The LED driver/amplifier circuit 508 comprises a pair of inverters, 610 and 612 coupled to the modulator 110 in order to convert the active output to a signal that is suitable for switching the base of the drive transistor 618. The voltage dividing circuit of resistors 614 and 616 sets a nominal bias voltage at the base of transistor 618. In a preferred embodiment, the transistor 618 is a Darlington transistor having a current gain of at least 300. The emitter voltage of the Darlington transistor 618 will be two diode drops, approximately 1.3 volts, below the bias voltage present at the base of transistor 618. This emitter voltage is applied to resistor 634, and determines the collector current flowing through both the transistor 618 and the three LED's 626, 628, and 630. The collector current in turn determines the intensity of the illumination of the LED's. The resistors 620, 622, and 624 act as transient snubbing elements which eliminate high frequency radiation by providing a current path when the LED's are turned off abruptly. These resistors are typically of high resistance and do not conduct a substantial portion of the LED ON current.

A temperature sensor (not shown) provides a temperature signal to the non-inverting amplifier comprised of op-amp 604 and resistors 606 and 608. The output of the non-inverting amplifier is provided to the base of transistor 618 via resistor 635. This output causes the DC bias voltage at the base of transistor 618 to change with temperature, and therefore adjusts the emitter voltage and collector current through resistor 634 as discussed above. In this manner, the intensity of the illumination of the LED's may be maintained at a constant value across a predetermined temperature range.

However, as known to one skilled in the art, various other means may be used to drive the LED's and provide for temperature compensation thereof.

The photo-emitter 102 is selectively positioned such that a substantially planar light beam emitted from photo-emitter and the associated optical system 102 traverses at least a portion of the pinch zone and impinges upon the vehicle interior, potentially including the associate trim elements that surround opening (not shown).

In the event an object is present in the field of the emitted light beam, the amplitude of the signal reflected off the object (not shown) is likely to vary based upon the size, orientation, and reflectivity of the object. The obstacle detection system detects variations in the output signal from the photo-detector 104 and compares the output to a known threshold value to determine the absence or presence of an object within the pinch zone. The obstacle detection system provides a signal indicative of the presence or absence of an object within the pinch zone.

Figure 2:
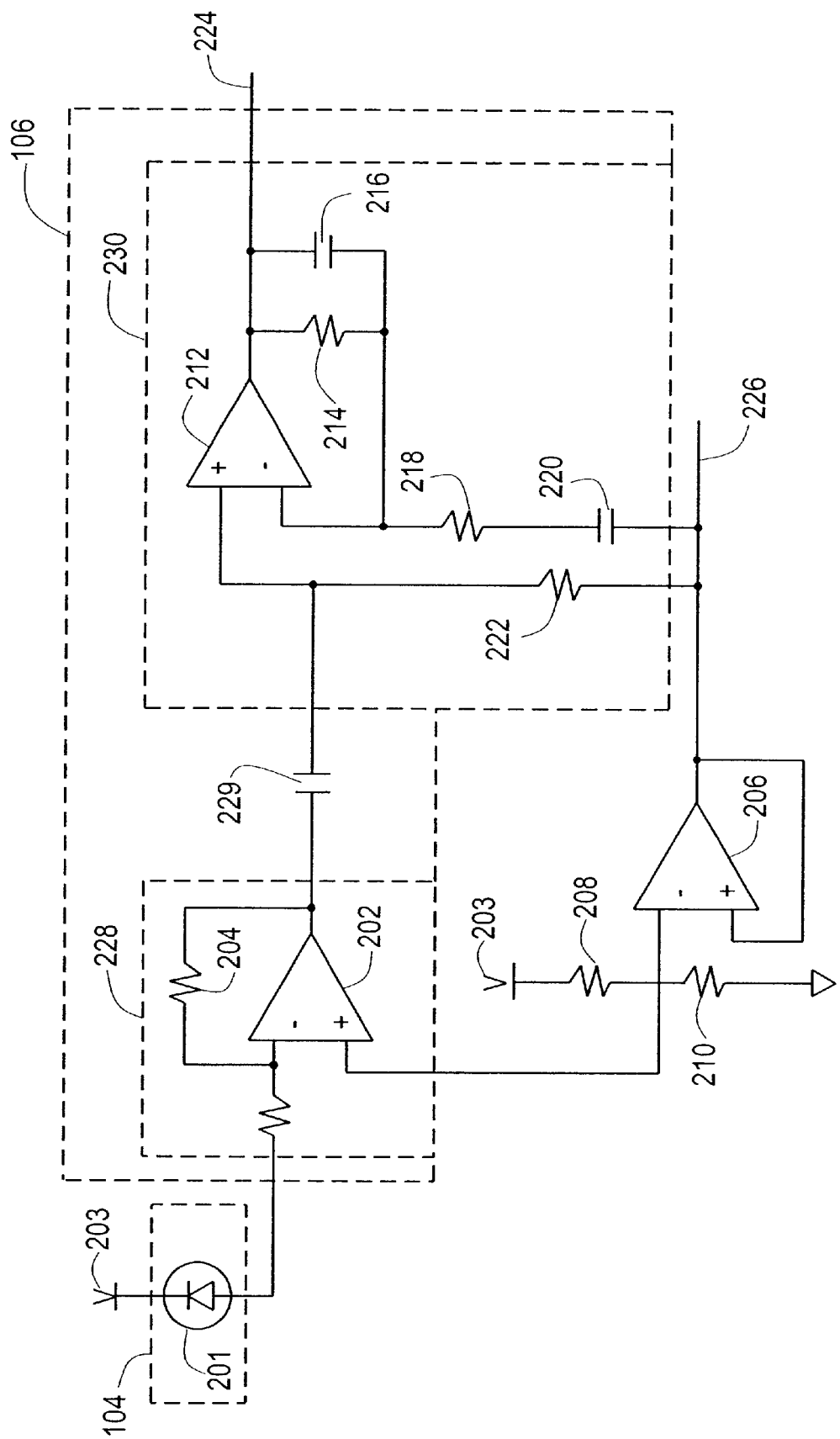
FIG. 2 is a schematic diagram of the photo-detector and input amplifier of FIG. 1.

FIG. 2 illustrates one embodiment of a suitable photo-detector 104 and input amplifier stage 106. Photo-detector 104 may be a photo-diode 201 produces a photo-current that is a function of the intensity of the incident light. A suitable photodiode will typically be a PIN photodiode that has a sufficiently fast response time to allow satisfactory operation at the desired modulation frequency. In addition, the PIN photodiode may be operated in a reverse bias mode as shown in FIG. 2 in order to increase the width of the depletion region, thus providing a greater bandwidth of operation. In the illustrated embodiment, a photodiode was chosen that is operable in the infrared wavelengths and has visible light blocking filters for wavelengths associated with sunlight.

Op-amp 202 and resistor 204 form a current-to-voltage converter 228 which converts the photo-current produced by photo-diode 201 into a voltage. In a preferred embodiment, resistor 204 is 10 k resistor. Op-amp 202 preferably has an input bias current that is substantially less than the signal current received from photo-diode 201, and in addition, should have slew rate of at least 3–4 volts/microsec in order to operate at modulation frequencies above 10 KHz. In the illustrated embodiment, the op-amp 202 is a single supply op-amp, and therefore a non-zero voltage, reference rail must be set about which the signal will swing. This reference rail is set by the combination of op-amp 206, resistors 208 and 210, and Vcc, the supply voltage 203. The voltage division of the supply voltage 203 will set the reference rail by the pair of resistors 208 and 210. In a preferred embodiment, resistors 208 and 210 are of equal value and the reference rail 236 is therefore set at Vcc/2 volts. Op-amp 206 is configured as a unity gain amplifier and provides a low impedance, reference rail 236 to AC amplifier 230 and other parts of the system as will be discussed below.

The output signal from op-amp 202 is AC coupled, via capacitor 229, to the AC amplifier 230 to block low frequency and DC signals arising from ambient illumination, particularly sunlight. Capacitor 299 and resistor 222 form a single-pole high pass filter with cutoff frequency of a few hundred Hertz. The next stage in this embodiment is an AC amplifier that is comprised of: op-amp 212; resistors 214, and 218; and capacitors 216 and 220. AC amplifier 230 provides an amplified signal on line 224. The preferred type of op-amps 202, 206, and 212 for single supply operation are rail-to-rail input and output Op-amps, having a low offset voltage and low noise. Because a single rail voltage supply is used, the common mode input range of the op-amps should include both ground and Vcc. In a preferred embodiment, resistor 214 is 100 k, capacitor 216 is 3 pf, resistor 218 is 5.1 k, capacitor 220 is 0.01 uf, and capacitor 229 is 0.22 uf. Op-amp 212 is a MAX4126, op-amp 206 is a TLC082, and op-amp 202 is a TLC082. All values are examples of a preferred embodiment.

Figure 3:
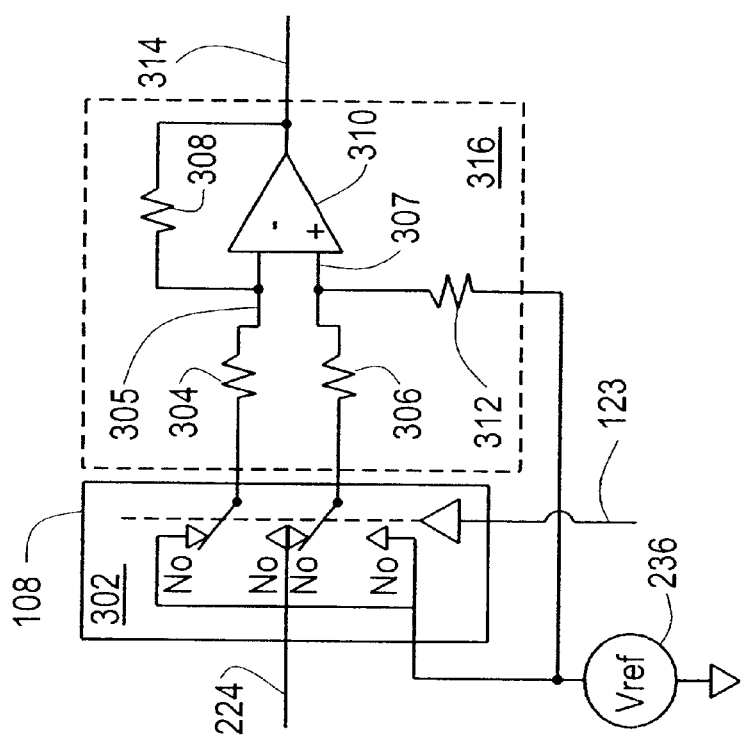
FIG. 3 is a schematic diagram of the switched amplifier of FIG. 1.

FIG. 3 illustrates one embodiment of a switched amplifier 108 in combination with the modulator 110 output signal 123 that provides synchronous detection of the pre-amplified detector output signal that is suitable for use with the obstacle detection system disclosed herein. Switching amplifier 108 employs a double-pole, double-throw switch pair 302 that simultaneously switches both input lines 224 and 226 between a normally open (NO) position and a normally closed (NC) position in response to the modulation input 123. The input line 224, which is connected to the preamplified detector output signal, and input line 226, which is connected to the reference voltage, are switched between the op-amp 310 input terminals 305 and 307 of difference amplifier 316. The switch 302 provides the preamplified detector output signal on input line 224 to the negative input 305 during the active phase of the modulation signal 123 and to the positive input 307 during the inactive phase of the modulation signal 123. Similarly, the reference signal voltage will be provided to the positive input 307 during the active phase of the modulation signal, and to the negative input 305 during the inactive phase of the modulation signal 123.

Op-amp 310, and resistors 304, 306, 308, and 312 comprise a conventional differential amplifier. Resistors 308 and 312 may have the same value as do resistors 304 and 306. When the switched amplifier is in the active phase, the output of the difference amplifier 316 is given by $$Vo=V(\text{reference})+G[V(\text{signal})-V(\text{reference})]$$

where the gain, G=R308/R304. When the switched amplifier is in the inactive phase, the inputs to the differential amplifier are reversed so that the output voltage will have the same magnitude but opposite polarity and is given by $$Vo=V(\text{reference})-G[V(\text{signal})-V(\text{reference})].$$

The output voltage over at least one measurement period will then average to V(reference) when duration of the active phase of the switched amplifier equals the duration of the inactive phase.

In the illustrated embodiment, resistors 308 and 312 are 100 k and resistors 304 and 306 are 10 k. Thus, the difference amplifier in the illustrated embodiment provides a nominal output of $10(V_+ - V_-)$, where $V_+$ is the voltage on the positive input 307, and $V_-$ is the voltage on the negative input 305.

Figure 4:
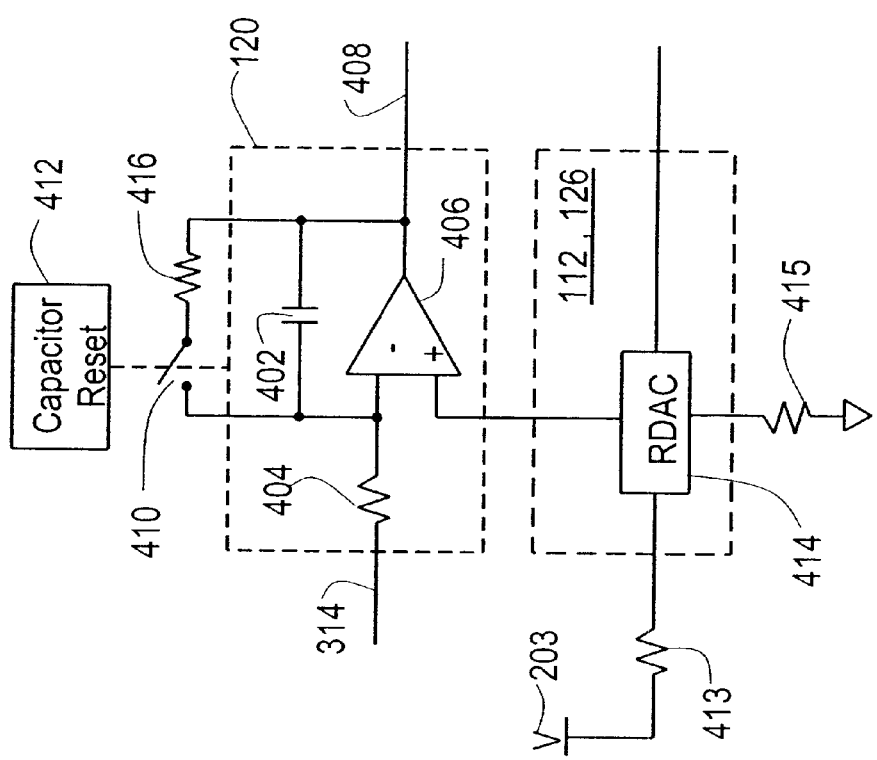
FIG. 4 is a schematic diagram of the subtraction module and integrator of FIG. 1.

FIG. 4 illustrates one embodiment of the difference module 118 and the integrator 114 that are suitable to use with the obstacle detection system. In the illustrative embodiment, difference module 118 and integrator 114 are combined into a circuit 120 comprising op-amp 406, capacitor 402, resistor 404, and offset voltage source 126. Thus, the signal present on the output line 408 will result from the integration of the current that flows through resistor 404 as a result of the difference between the voltage of the input signal on line 314 and the adjustable offset voltage 416 which is applied to the non-inverting terminal of op amp 406.

Circuit 112 in FIG. 4 shows one embodiment of an adjustable voltage source which provides the adjustable offset voltage 416 for the integrator. In this embodiment a resistive digital to analog converter (RDAC) 414 such as an AD8400 is used. This device is the equivalent to a digital controlled potentiometer with 256 possible resistance settings. It is configured as a voltage divider in conjunction with resistors 413 and 415. By using an RDAC as opposed to conventional digital to analog converter (DAC) it is possible to confine the total voltage adjustment to a narrow range on either side of the system reference voltage. In the illustrated embodiment, for example, resistors 413 and 415 have the same value and the values of 413, 414, and 415 are selected to provide an increment of 200 microvolts for each of the 256 steps. In other embodiments, circuit function 112 may be implemented with the use a DAC, a manually set potentiometer or any combination of an RDAC, DAC and manual potentiometer.

The single-pole-single-throw switch illustrated in FIG. 4 serves the function of discharging the integration capacitor 402 of circuit 120. This may be a normally open or normally closed switch such as the MAX4502 and MAX4501, respectively. Both devices are responsive to operation by the control system such as the microcontroller 122. A measurement cycle commences with the switch set to the closed position for a sufficient time to discharge capacitor 402. The discharge time is a small multiple of the time constant associated with capacitor 402 and resistor 416. Resistor 416 is represents the combination of the intrinsic resistance of the switch and any resistors which may be added to prevent the current discharge of capacitor 402 from exceeding the specified limits associated with the switch 410. In the illustrated embodiment, the reset event 412 requires switch 410 to be closed for a minimum of one millisecond.

In some embodiments, particularly those in which cost is a primary factor and high performance is not required, switch 410 may be replaced by a resistor. The value of the resistor substitute is selected such the resulting time constant represented by the product of the selected resistor value times the value of capacitor 402 is commensurate with the measurement time.

In the absence of a signal on line 314 caused by the presence of an object in the opening, it is desirable to have the integrated output of 120 remain at a constant value so any change in the state of the integrator output can be used to indicate that there is an obstacle in the opening. The presence of an adjustable reference voltage for the electronic integration 120 of the signal 314 makes it possible to initialize the sensor so as to cancel any modulated signals that are returned to the sensor from opposing members of the window or door opening or fixed features in the vicinity that do not result from an obstacle. Initialization can take place at any moment when it is known that there no obstacle in the opening. A typical instance for this to occur is at the time of assembly of the integrated system comprised of sensor and the associated door or window. There may be other times, however, at which initialization can take place over the lifetime of the system and will depend on the nature of the application. The process of initialization takes place with the sensor operating in the normal mode by adjusting the reference voltage from 112 while simultaneously monitoring the output of the integrator 408. In the absence of an object in the opening the offset voltage is adjusted to a value for which the integrator output 408 remains constant over the measurement period. Thus any object which appears in the opening which causes a change in the reflected signal from the initialized value will provide indicia of its presence.

The sensitivity of the detection scheme described above will increase with the duration of the measurement time. However, the application also requires that the measurement process occur with sufficient rapidity that movement of the window can be arrested quickly without striking or entrapping any object between measurement cycles. In the illustrated embodiment the maximum measurement time required to detect the smallest obstacle of interest was set to 100 ms. It should be recognized that larger obstacles will the provide an indication in less time.

Initialization as described above takes place with the photo-emitter switching between the active and inactive states thus providing modulated illumination into the opening. In some embodiments requiring greater sensitivity or operation over a wider range of environmental conditions it is useful to also initialize the sensing system with the photo-emitter inactive. In a manner similar to the initialization described above, the offset voltage is adjusted with the photo-emitter inactive while maintaining the modulation input to the switched amplifier until the output voltage is unchanged over the measurement period. In this way signals that are intrinsic to the circuit itself such as leakage currents and offset voltages may be canceled prior to making a subsequent measurement with the photo-emitters active. This secondary initialization process may take place just prior to an active measurement or at any time when the sensor is dormant.

Detector 116 may be a voltage comparator having a first input coupled to a reference threshold voltage and a second input coupled to the integrator 114 output 408. The comparator changes the output state when the integrator output exceeds the reference threshold voltage. In this case the length of time required for the integrator to reach the threshold voltage as measured from the time of reset of switch 410 of FIG. 4 may used to infer the relative size of the obstacle. In a preferred embodiment, a threshold of 1.25 V is used. As described above, the output of the comparator may used to trigger a pulse generator that resets switch 410 directly and thereby initiating a new measurement cycle. In this case a free-running oscillator will be formed whereby the frequency of reset pulses can be used as an indication of the state of the monitored opening.

Alternatively, the detector may be a micro-controller or microprocessor having an internal analog-digital (A/D) converter, or controlling an external A/D converter, in which the output from integrator 114 is converted to a binary number and compared to a threshold number previously stored in a memory.

Those of ordinary skill in the art should further appreciate that variations to and modification of the above-described methods and apparatus for providing object detection in an aperture in the path of a closure member may be made without departing from the inventive concepts disclosed herein. Accordingly, the invention should be viewed as limited solely by the scope and spirit of the appended claims.

What is claimed is:

1. A method of detecting an optical signal in the presence of ambient light, the method comprising the steps of:

receiving an optical signal having a first frequency and a first phase in the presence of an ambient light signal;

amplifying said received optical signal and said ambient light signal;

synchronously detecting said received optical signal and ambient light signal to provide a synchronously detected signal;

subtracting said synchronously detected signal from a predetermined offset voltage to provide a subtracted signal, initializing an integrator to a known value;

integrating said subtracted signal over a predetermined period of time with said integrator to provide an integrated signal; and detecting a change in said integrated signal indicative of a change in said optical signal.

2. The method of claim 1 wherein the step of amplifying includes filtering said received signal through a band-pass filter.

3. The method of claim 1 wherein the step of synchronously detecting includes the steps of:

switching said amplified received optical signal and said ambient light signal at said first frequency and substantially at said first phaae between first and second outputs;

amplifying, with a first gain, said optical signal received at a first input; and amplifying, with a second gain, said optioal signal received at a second input.

4. The method of claim 1 wherein the step of initializing further includes the step of generating an adjustable offset voltage.

5. The method of claim 4 wherein the step of generating an adjustable offset voltage includes the steps of generating an optical signal during an initialization period when no obstacle is present and adjusting the offset voltage such that the integrated signal is substantially zero during the initialization period.

* * * * *

UNITED STATES PATENT AND TRADEMARK OFFICE
CERTIFICATE OF CORRECTION

PATENT NO. : 6,693,271 B2  
DATED : February 17, 2004  
INVENTOR(S) : Christopher J. O'Connor et al.

It is certified that error appears in the above-identified patent and that said Letters Patent is hereby corrected as shown below:

Column 13,
Line 14, "phaae" should read -- phase --; and

Column 14,
Line 3, "optioal" should read -- optical --.

Signed and Sealed this

Twenty-third Day of November, 2004

JON W. DUDAS
*Director of the United States Patent and Trademark Office*